US 6,568,891 B2

(12) United States Patent
DeLong

(10) Patent No.: US 6,568,891 B2
(45) Date of Patent: May 27, 2003

(54) DUNNAGE BAR

(75) Inventor: Ronald B. DeLong, Belmont, MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 09/965,441

(22) Filed: Sep. 27, 2001

(65) Prior Publication Data

US 2002/0015626 A1 Feb. 7, 2002

(51) Int. Cl.⁷ .................................................. B60P 7/15
(52) U.S. Cl. ......................................... 410/43; 410/143
(58) Field of Search ......................... 410/43, 143, 32, 410/34, 121; 211/162, 41.1, 94.02; 248/225.11

(56) References Cited

U.S. PATENT DOCUMENTS

| 908,858 | A | | 1/1909 | Goddard |
| 1,888,151 | A | | 11/1932 | Walper |
| 1,890,077 | A | | 12/1932 | Elting |
| 2,284,422 | A | | 5/1942 | Hall |
| 3,073,260 | A | | 1/1963 | Dunlap et al. |
| 3,427,847 | A | | 2/1969 | Harper |
| 3,896,650 | A | | 7/1975 | O'Konski |
| 4,050,277 | A | | 9/1977 | Malott et al. |
| 4,142,663 | A | | 3/1979 | Blatnik et al. |
| 4,238,550 | A | | 12/1980 | Burgess et al. |
| 4,366,692 | A | | 1/1983 | Judkins et al. |
| 4,553,888 | A | | 11/1985 | Crissy et al. ............... 410/144 |
| 5,037,256 | A | | 8/1991 | Schroeder ................... 410/143 |
| D324,506 | S | | 3/1992 | Phillips |
| 5,141,114 | A | | 8/1992 | Cate, Jr. et al. |
| 5,326,204 | A | | 7/1994 | Carlson et al. ............. 410/143 |
| 5,378,093 | A | * | 1/1995 | Schroeder .................... 410/32 |
| 5,379,904 | A | | 1/1995 | Brown |
| 5,520,316 | A | | 5/1996 | Chen |
| 5,582,495 | A | * | 12/1996 | Schroeder .................... 410/32 |
| 5,584,624 | A | * | 12/1996 | DeVoursney ................ 410/143 |
| 5,605,239 | A | | 2/1997 | DeVoursney et al. |
| 5,657,605 | A | | 8/1997 | Sidney |
| 5,876,165 | A | | 3/1999 | Campbell .................... 410/43 |
| 6,146,068 | A | * | 11/2000 | Schroeder .................... 410/35 |
| 6,394,721 | B1 | * | 5/2002 | Campbell ................... 410/143 |

* cited by examiner

Primary Examiner—Stephen T. Gordon
(74) Attorney, Agent, or Firm—Price, Heneveld, Cooper, Dewitt & Litton

(57) ABSTRACT

A dunnage rack includes a dunnage bar adapted to receive an insert, where the insert is shaped to support parts for material handling purposes, and includes a cushioning portion, a retainer portion, and an interconnecting portion. The dunnage bar includes a tube section made from a single sheet of material. The tube section has a wall with a face surface and has longitudinally extending first and second rows of L-shaped tabs extending from the face surface that are formed from the material of the wall. The wall has apertures corresponding to locations of the L-shaped tabs. The L-shaped tabs defining a channel on the face surface that is adapted to receive the retainer portion and engage the retainer portion in a longitudinal direction. The L-shaped tabs further define an access opening into the channel for receiving the interconnecting portion of the tube section to structurally support the insert on the face surface.

10 Claims, 2 Drawing Sheets

DUNNAGE BAR

BACKGROUND

The present invention relates to dunnage racks used to store and transport parts, such as automotive parts, and more particularly to a bar used in such racks.

Dunnage racks are widely used in manufacturing to store and transport parts, for example, automotive parts. These racks include a frame and a plurality of horizontal bars supported on the frame. Modular connectors permit the bars to be spaced and positioned in a wide variety of configurations to accommodate different parts to be stored in the rack. A plastic and/or foam insert, generally well known to those having skill in the art, typically is mounted within each bar to engagingly support the parts.

Known dunnage bars are basically of two constructions. A first is extruded of aluminum and includes a T-shaped slot within which the insert is retained. These aluminum bars are relatively expensive. Further, the bars are subject to considerable pilferage because of their value as scrap aluminum.

A second is fabricated of two roll-formed steel pieces as illustrated in FIG. 5 of U.S. Pat. No. 5,605,239. The outer piece is generally C-shaped and includes three closed planar sides and a fourth open side defining a mouth. An inner piece is positioned in the mouth and is generally trough-shaped. The two pieces are nested and then spot-welded together at spaced locations to intersecure the pieces. While this steel bar is less expensive than the extruded aluminum bar, it requires welds to be placed along both longitudinal sides of the dunnage bar. Additionally, the inner and outer pieces can break apart from each other as a result of faulty welds or heavy loads.

A third style one-piece dunnage bar is shown in U.S. Pat. No. 5,605,239. This dunnage bar is fabricated of a single piece of sheet metal roll-formed into a tubular shape, with one side of the dunnage bar including opposing L-shaped flanges shaped to engage a slotted base of a polymeric insert. However, in order to make the dunnage bar from a single piece of sheet metal, the L-shaped flanges are necessarily double-thickness, which results in a tight fold and high material stress at the point where the single wall is bent sharply back upon itself. A problem is that the material in the area of the tight fold can fracture due to high stress concentrations generated at the tight fold during manufacture of the dunnage bar. This reduces the desirability of the dunnage bar since the fractured corners look bad, can cause difficulty in assembling or replacing inserts on the dunnage bars, can reduce a strength of the dunnage bars, can lead to rust and corrosion, and can result in safety issues for workers. The double thickness walls also waste material, since two walls are located where only a single wall is needed. The double thickness walls also create problems with using conventional inserts, since conventional inserts are only adapted to receive L-shaped flanges having a single wall thickness. It is noted that the U.S. Pat. No. 5,605,239 discloses that the double-thickness walls can be made from individual single walls having a half thickness, but this increases the manufacturing cost for making the dunnage bars, or leads to higher raw material costs.

Accordingly, a dunnage bar is desired solving the aforementioned problems and having the aforementioned advantages.

SUMMARY OF THE PRESENT INVENTION

In one aspect of the present invention, a dunnage rack includes a dunnage bar adapted to receive an insert, where the insert is shaped to support parts for material handling purposes, and includes a cushioning portion, a retainer portion, and an interconnecting portion. The dunnage bar includes a tube section made from a single sheet of material. The tube section has a wall with a face surface and has longitudinally extending first and second rows of L-shaped tabs extending from the face surface that are formed from the material of the wall. The wall has apertures corresponding to locations of the L-shaped tabs. The L-shaped tabs defining a channel on the face surface that is adapted to receive the retainer portion and engage the retainer portion in a longitudinal direction. The L-shaped tabs further define an access opening into the channel for receiving the interconnecting portion of the tube section to structurally support the insert on the face surface.

In another aspect of the present invention, a tubular bar adapted to longitudinally receive an insert includes a tube section having four orthogonally-related flat walls. One of the walls has a face surface and has longitudinally extending first and second rows of tabs extending from the face surface that are formed from the material of the tube section. The tube section has apertures corresponding to locations of the tabs, with the apertures being located in spaced-apart positions to maintain a strength of the tube section. The tabs in the first row include legs facing toward the tabs in the second row, such that the first and second tabs define a channel on the face surface that is adapted to receive a retainer portion of an insert. The first and second tabs define an access opening into the channel that is adapted to receive an interconnecting portion of the insert, with the tube section structurally supporting the insert on the face surface.

In another aspect of the present invention, a method includes providing a roll of sheet material suitable for use as a dunnage bar. The method further includes unrolling the sheet material and forming two rows of L-shaped tabs in the sheet material, with the two rows defining a longitudinally engageable channel on the sheet material and an access opening into the channel from a lateral direction. The method still further includes forming the sheet material into a tubular shape, and retaining edges of the sheet material together to permanently fix the tubular shape.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
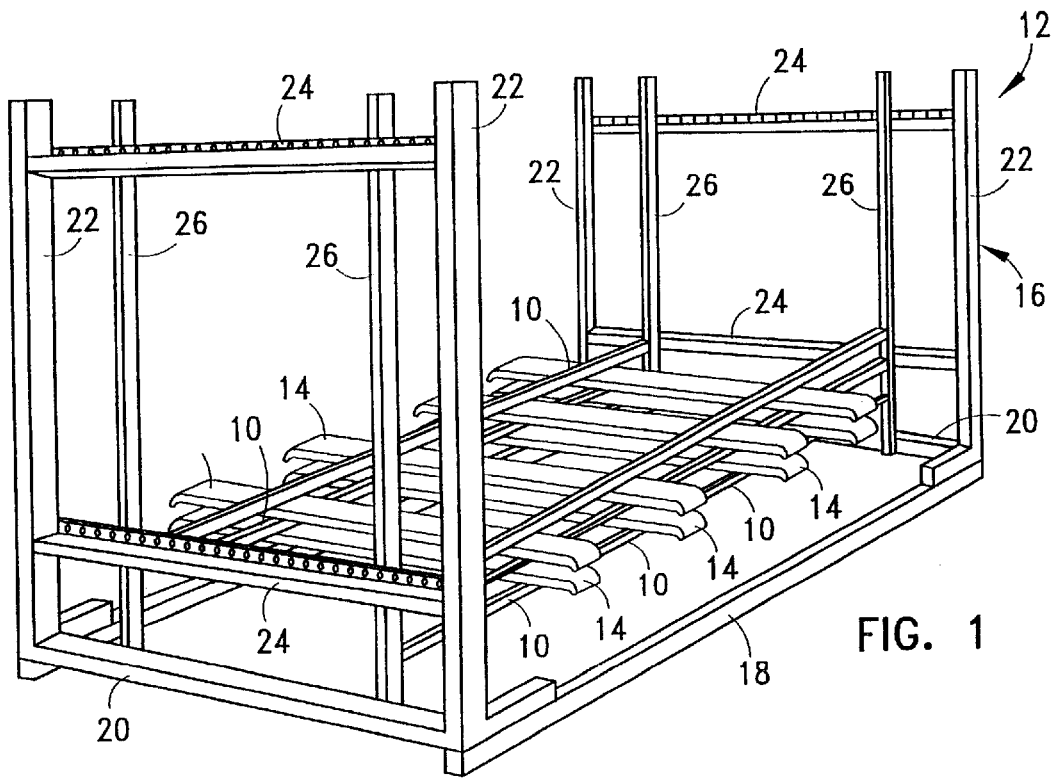
FIG. 1 is a perspective view of a dunnage rack incorporating the dunnage bar of the present invention.

The dunnage bar 10 of the present invention is illustrated in FIGS. 1–6. As illustrated in FIG. 1, a plurality of the dunnage bars 10 are mounted within and become a portion of a dunnage rack 12.

With the exception of the dunnage bars 10, the dunnage rack 12 is generally known to those skilled in the art. For example, such dunnage racks are widely used in the automotive industry to store and transport parts, components, subassemblies, stampings, and the like within and between manufacturing facilities. As illustrated in FIG. 1, the dunnage rack 12 holds automobile bumpers 14.

The dunnage rack 12 includes a frame 16 including horizontal base members 18 and end frames 20. The end frame sections 20 in turn include a plurality of vertical uprights 22, horizontal supports 24, and vertical supports 26. As is known, the horizontal supports 24 and the vertical supports 26 can be interconnected in a variety of configurations on the vertical uprights 22. Also as is well known, the dunnage bars 10 are mounted on the horizontal and/or vertical members 24 and 26 using conventional attachment hardware (not shown).

Figure 2:
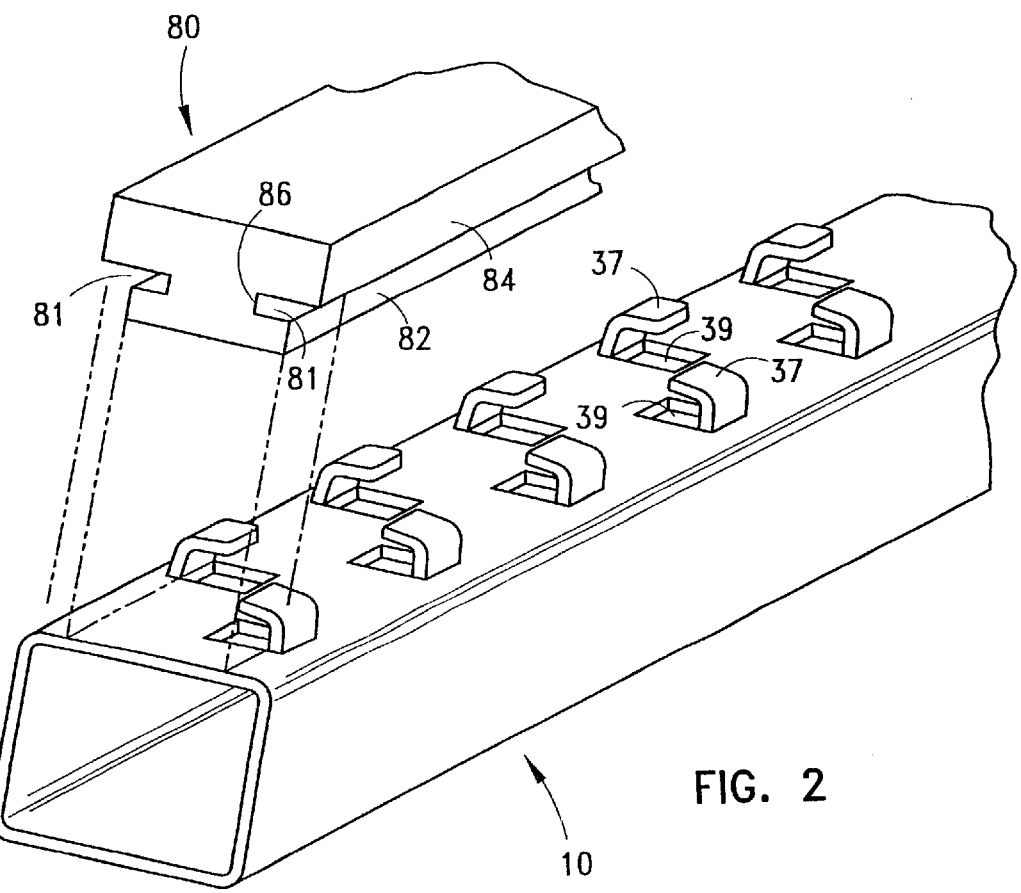
FIG. 2 is an exploded perspective view of a section of the dunnage bar with the insert exploded away.
Figure 3:
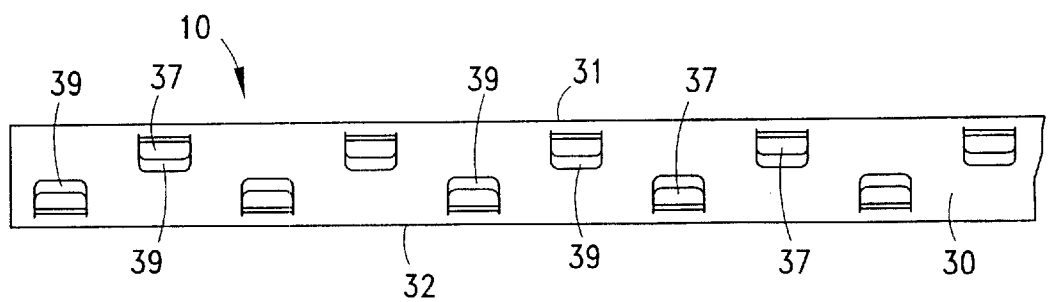
FIGS. 3–5 are top, side, and end views of the dunnage bar shown in FIG. 2.
Figure 4:
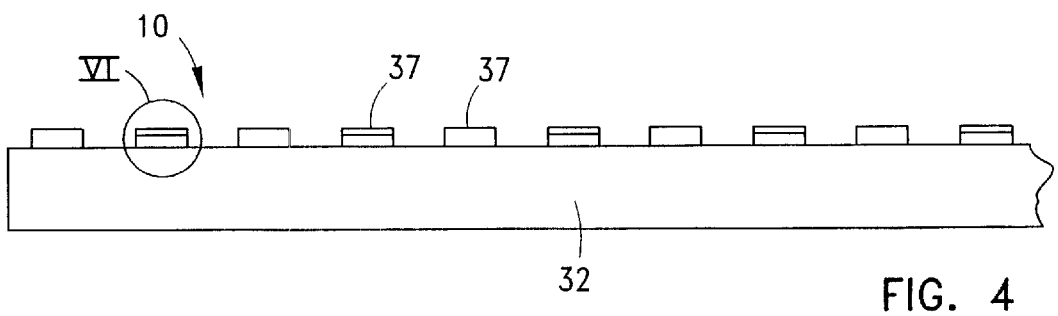
Figure 5:
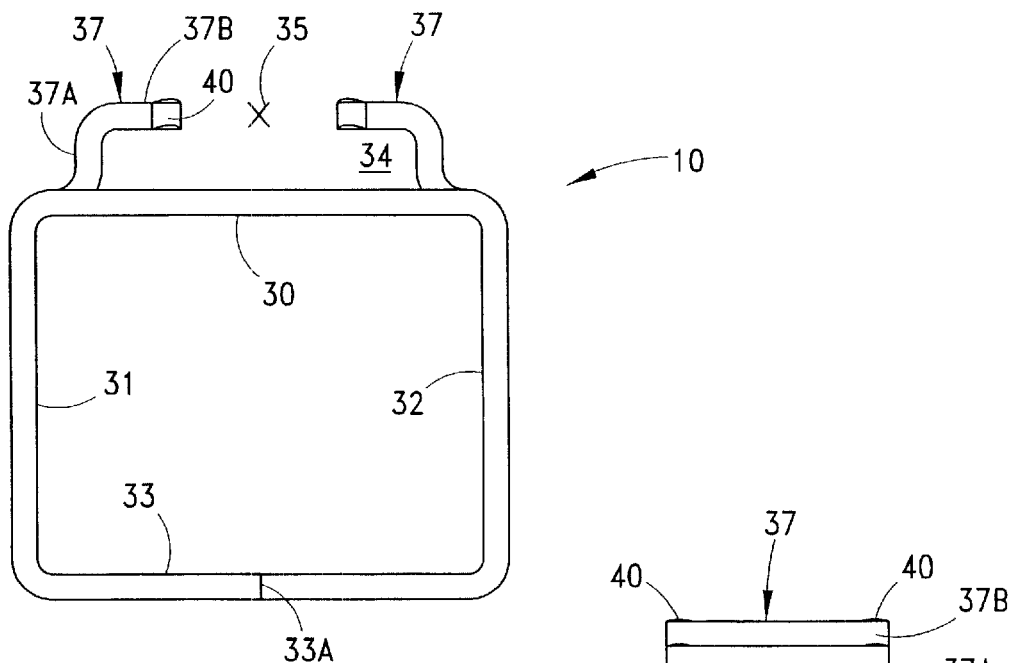
Figure 6:
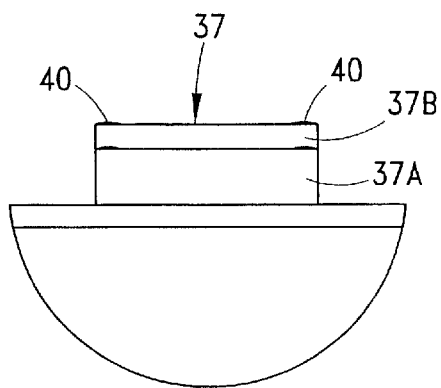
FIG. 6 is an enlarged view of the circled area VI in FIG. 4.

The inserts 80 are generally well known and therefore will be only briefly described. As best illustrated in FIG. 2, the insert is H-shaped including an inner retainer portion 82 located within the bar 10, an outer cushion portion 84 located outside the bar 10, and an interconnecting portion 86. The inserts 80 are slid longitudinally into the bars 10 to provide one cushioned side to the bar to engage the parts to be supported. Notably, the cushion portion 84 of the insert 80 can be modified to include a plurality of scallops or cups along its length, with the scallops or cups being shaped to matingly receive parts to be shipped while holding the parts at spaced-apart locations from one another.

The dunnage bar 10 (FIGS. 2–3) is fabricated from a single sheet of metal, such as 12-gauge cold rolled steel, and is rollformed into a tube with flat side walls 30–33. L-shaped flanges are formed out of one wall 30 to form a channel 34 and mouth 35 for receiving and engaging an insert 80, as described below. In a preferred mode, the tube is welded into a permanent shape with a weld bead 33A located opposite the wall 30, which maintains a symmetrical shape of the tube. It is contemplated that the dunnage bar 10 can be made of other materials, such as aluminum, and formed by other means, such as by stamping. Still further, it is contemplated that the dunnage bar can have different tubular shapes, and/or can even have internally-positioned stiffeners if desired.

The illustrated dunnage bar 10 includes four orthogonally-related walls 30–33 forming a square tube. The insert-supporting wall 30 includes two rows of oppositely-facing L-shaped flanges or tabs 37 forming the open rectangular channel 34 on an outer face of the wall 30, with an access opening or mouth 35 into the channel 34. The flanges 37 are stamped out of and integrally formed from the material of the wall 30, such that they leave an alternating pattern of apertures 39 along the wall 30. The flanges 37 are sufficiently large in size and number to securely engage side grooves 81 in the insert 80 to retain the insert to the wall 30, but are sufficiently small and spaced apart such that the remaining material between and around the apertures 39 connects the walls 31–32 with sufficient strength to satisfy the structural requirements of the tubular dunnage bar 10. For example, the illustrated L-shaped flanges 37 extend over the wall 30 to about a quarter of the width of wall 30, and are formed from a square section of material that extends about half of the width of the wall 30 (i.e. before the flanges 37 are bent into their final "L" shape). The flanges 37 include a base or vertical leg 37A and a perpendicular or horizontal leg 37B that extends parallel wall 30. Outer corners 40 of the leg 37B of the flanges 37 are radiused to reduce burr formation and also flared out about a quarter thickness of the material in order to reduce a tendency of the corners to unacceptably drag on an insert 80 being longitudinally slidingly installed onto the flanges 37.

In the illustrated embodiment, the tabs-like flange 37 has a horizontal leg 37B that extends parallel to the wall 30 and that defines a distance that is between about 10% and 30% of a total width of the tube section of the bar 10. The channel between the flanges 37 define a distance equal to 50% to 90% of a transverse width of the tube section, and more particularly extends about 60% to 70% of the transverse width. The apertures 39 corresponding to the tab flanges 37 are a longitudinal distance that is about three times the longitudinal width of the flanges 37. The apertures 39 extend less than about 50% of a transverse width of the tube section.

It is contemplated that a variety of different methods are possible, and these alternative methods are contemplated to be within the scope of a person skilled in this art. Nonetheless, a preferred method of manufacturing the present dunnage bar 10 includes providing a roll of sheet material having the strength, corrosion resistance, and formability suitable for use as a dunnage bar. The method further includes unrolling the sheet material and forming two opposing rows of L-shaped tabs in the sheet material, such as by stamping in the two opposing rows of L-shaped tabs 37, with the two rows defining a longitudinally engageable channel on the sheet material and defining an access opening into the channel from a perpendicular direction. The method still further includes forming the sheet material into a tubular shape, and retaining edges of the sheet material together to permanently fix the tubular shape.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. In a dunnage rack including a dunnage bar adapted to receive an insert, where the insert is shaped to support parts for material handling purposes and includes a cushioning portion, a retainer portion, and an interconnecting portion, an improvement in the dunnage bar comprising:

a tube section made from a single sheet of material, the tube section having a wall with a face surface and having longitudinally-extending first and second rows of L-shaped tabs extending from the face surface that are formed from material of the wall, the wall having apertures corresponding to locations of the L-shaped tabs, the L-shaped tabs defining a channel on the face surface that is adapted to receive and engage the retainer portion in a longitudinal direction and defining an access opening into the channel that is adapted to receive the interconnecting portion with the tube section structurally supporting the insert on the face surface.

2. The combination defined in claim 1, wherein the tabs of the first and second rows each include a leg that extends parallel to the wall and that is spaced from the wall.

3. The combination defined in claim 1, wherein the L-shaped tabs in the first row are formed from a square section of material.

4. The combination defined in claim 3, wherein the tabs of the first row each include a leg that extends parallel to the wall and that defines a distance that is between 10% and 30% of a total transverse width of the tube section.

5. The combination defined in claim 1, wherein the channel defines a distance equal to 50% to 90% of a transverse width of the tube section.

6. The combination defined in claim 5, wherein the channel extends about 60%–70% of the transverse width of the tube section.

7. The combination defined in claim 1, wherein the tabs include corners that are flared outwardly away from the wall to reduce burrs and sharp corners on a side of the tabs close to the wall.

8. The combination defined in claim 1, wherein the tabs of the first row have a longitudinal width, and the apertures corresponding to the tabs of the first row are located from adjacent apertures a longitudinal distance that is about three times the longitudinal width of the tabs.

9. The combination defined in claim 1, wherein the apertures extend less than 50% of a transverse width of the tube section.

10. The combination defined in claim 1, wherein the apertures corresponding to the tabs of the first row and the apertures corresponding to the tabs of the second row are positioned alternatingly along a length of the tube section to maintain a strength of the wall.

* * * * *